(12) United States Patent
Shirai

(10) Patent No.: US 9,436,285 B2
(45) Date of Patent: Sep. 6, 2016

(54) DISPLAY INPUT DEVICE AND INFORMATION PROCESSING APPARATUS

(71) Applicant: KYOCERA Document Solutions Inc., Osaka-shi, Osaka (JP)

(72) Inventor: Wataru Shirai, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 11 days.

(21) Appl. No.: 14/583,526

(22) Filed: Dec. 26, 2014

(65) Prior Publication Data

US 2015/0185847 A1 Jul. 2, 2015

(30) Foreign Application Priority Data

Dec. 27, 2013 (JP) .................................. 2013-270879

(51) Int. Cl.
*G06F 3/01* (2006.01)
*H04N 1/00* (2006.01)

(52) U.S. Cl.
CPC ........... *G06F 3/016* (2013.01); *H04N 1/00411* (2013.01); *H04N 2201/0094* (2013.01)

(58) Field of Classification Search
CPC .............. G06F 3/016; H04N 1/00411; H04N 2201/0094
See application file for complete search history.

(56) References Cited

U.S. PATENT DOCUMENTS

| 2007/0080951 A1* | 4/2007 | Maruyama | G06F 1/1626 345/173 |
| 2008/0280657 A1* | 11/2008 | Maenpaa | G06F 1/1601 455/575.1 |
| 2009/0322695 A1* | 12/2009 | Cho | G06F 3/0416 345/173 |
| 2010/0315364 A1 | 12/2010 | Miyake | |
| 2010/0328230 A1* | 12/2010 | Faubert | G06F 1/1626 345/173 |
| 2011/0032091 A1 | 2/2011 | Park et al. | |
| 2012/0194460 A1* | 8/2012 | Kuwabara | G06F 3/016 345/173 |
| 2013/0278536 A1* | 10/2013 | Nakamura | G06F 3/016 345/173 |

FOREIGN PATENT DOCUMENTS

| JP | 2004094389 A | 3/2004 |
| JP | 2004253004 A | 9/2004 |
| JP | 2010286986 A | 12/2010 |
| JP | 2011040027 A | 2/2011 |

\* cited by examiner

*Primary Examiner* — Andrew Sasinowski
*Assistant Examiner* — Chun-Nan Lin
(74) *Attorney, Agent, or Firm* — Alleman Hall McCoy Russell & Tuttle LLP

(57) ABSTRACT

A display input device includes a display portion, a touch panel, a piezoelectric element, a press detection portion, and a vibration control portion. The touch panel is provided on an upper surface of the display portion and configured to detect a touch operation. The piezoelectric element is provided on one or both of a front surface and a back surface of the touch panel. The press detection portion is configured to detect a press operation performed with a greater press force than in the touch operation detected by the touch panel, in accordance with output voltage from the piezoelectric element. The vibration control portion is configured to, when a press operation of the piezoelectric element is detected by the press detection portion, apply a repelling voltage for exerting a force in a direction of repelling the press operation, to the piezoelectric element.

3 Claims, 6 Drawing Sheets

DISPLAY INPUT DEVICE AND INFORMATION PROCESSING APPARATUS

INCORPORATION BY REFERENCE

This application is based upon and claims the benefit of priority from the corresponding Japanese Patent Application No. 2013-270879 filed on Dec. 27, 2013, the entire contents of which are incorporated herein by reference.

BACKGROUND

The present disclosure relates to a display input device having a touch panel, and an information processing apparatus including the display input device.

Conventionally, there is known a display input device having a display portion on which touch keys associated with various kinds of operation contents are displayed, and a touch panel provided on the display portion, for detecting the position of a user's touch operation. A display input device of this type is used as a user interface of an information processing apparatus such as a copy machine, a facsimile device, a scanner device, a multifunction peripheral, a personal computer, or a tablet terminal, for example.

However, when operating a touch panel, a user cannot obtain a feeling of operation (click feeling) as if pressing an operation button. Regarding this, there is known a technique of, when a touch panel is operated, displaying the fact that the operation has been performed, by a vibration animation. In addition, there is known a technique of transferring a feeling of operation to a user by vibrating a touch panel when the touch panel is operated.

SUMMARY

A display input device according to one aspect of the present disclosure includes a display portion, a touch panel, a piezoelectric element, a press detection portion, and a vibration control portion. The touch panel is provided on an upper surface of the display portion and configured to detect a touch operation. The piezoelectric element is provided on one or both of a front surface and a back surface of the touch panel. The press detection portion is configured to detect a press operation performed with a greater press force than in the touch operation detected by the touch panel, in accordance with output voltage from the piezoelectric element. The vibration control portion is configured to, when a press operation of the piezoelectric element is detected by the press detection portion, apply a repelling voltage for exerting a force in a direction of repelling the press operation, to the piezoelectric element.

An information processing apparatus according to another aspect of the present disclosure includes the display input device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

[Schematic Configuration of Image Forming Apparatus 10]

Figure 1A:
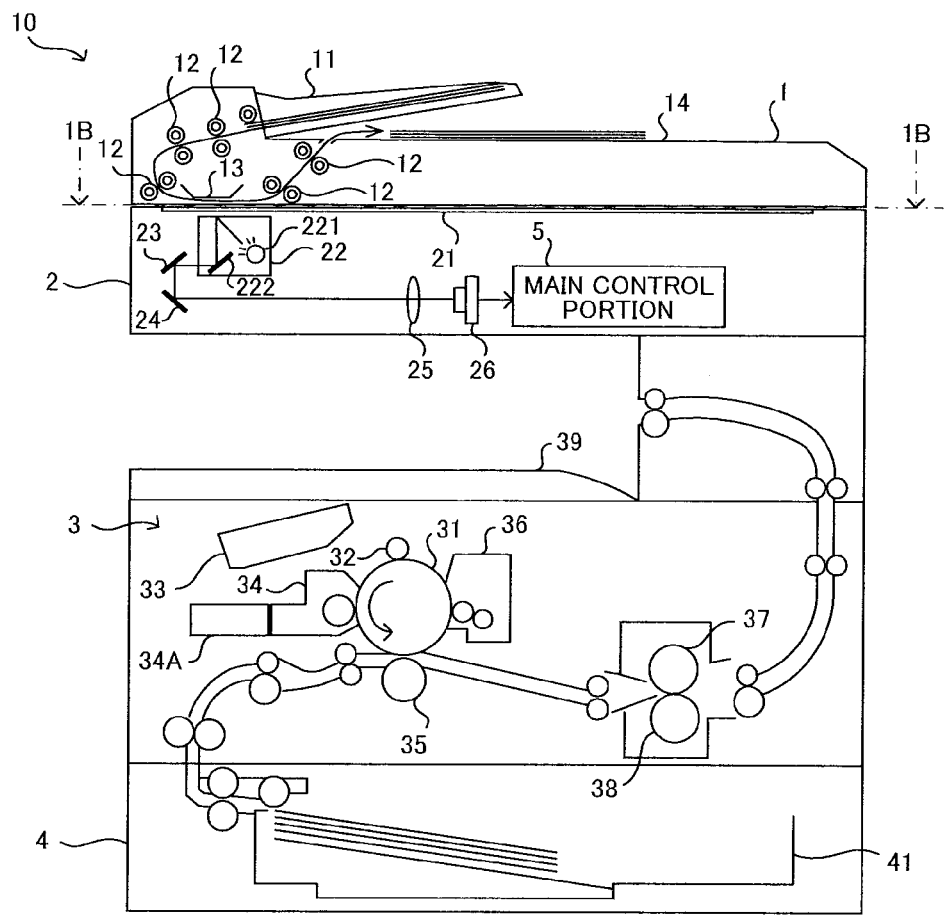
FIG. 1A and FIG. 1B are schematic diagrams showing the configuration of an information processing apparatus according to an embodiment of the present disclosure.

First, the schematic configuration of an image forming apparatus 10 according to an embodiment of the present disclosure will be described. FIG. 1A is a front schematic diagram showing the configuration of the image forming apparatus 10, and FIG. 1B is a view as seen from a 1B-1B arrow direction in FIG. 1A.

Figure 1B:
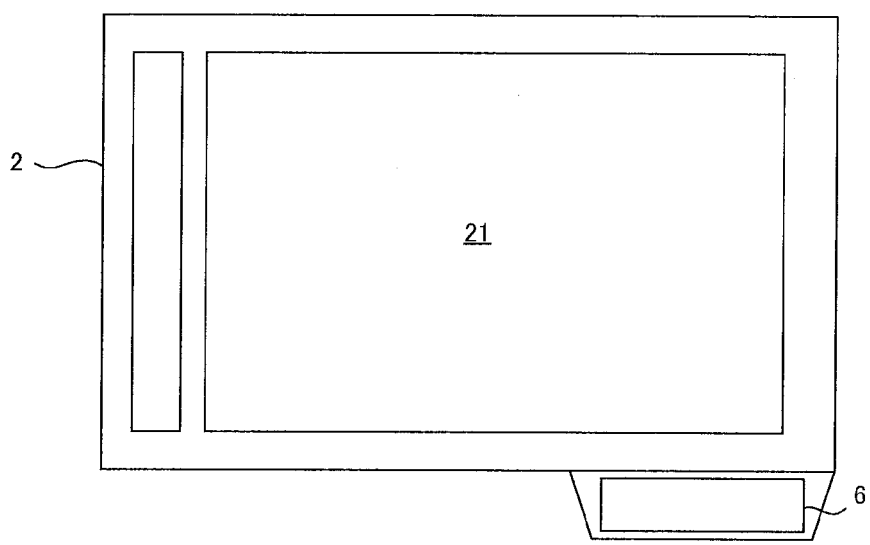
Figure 2:
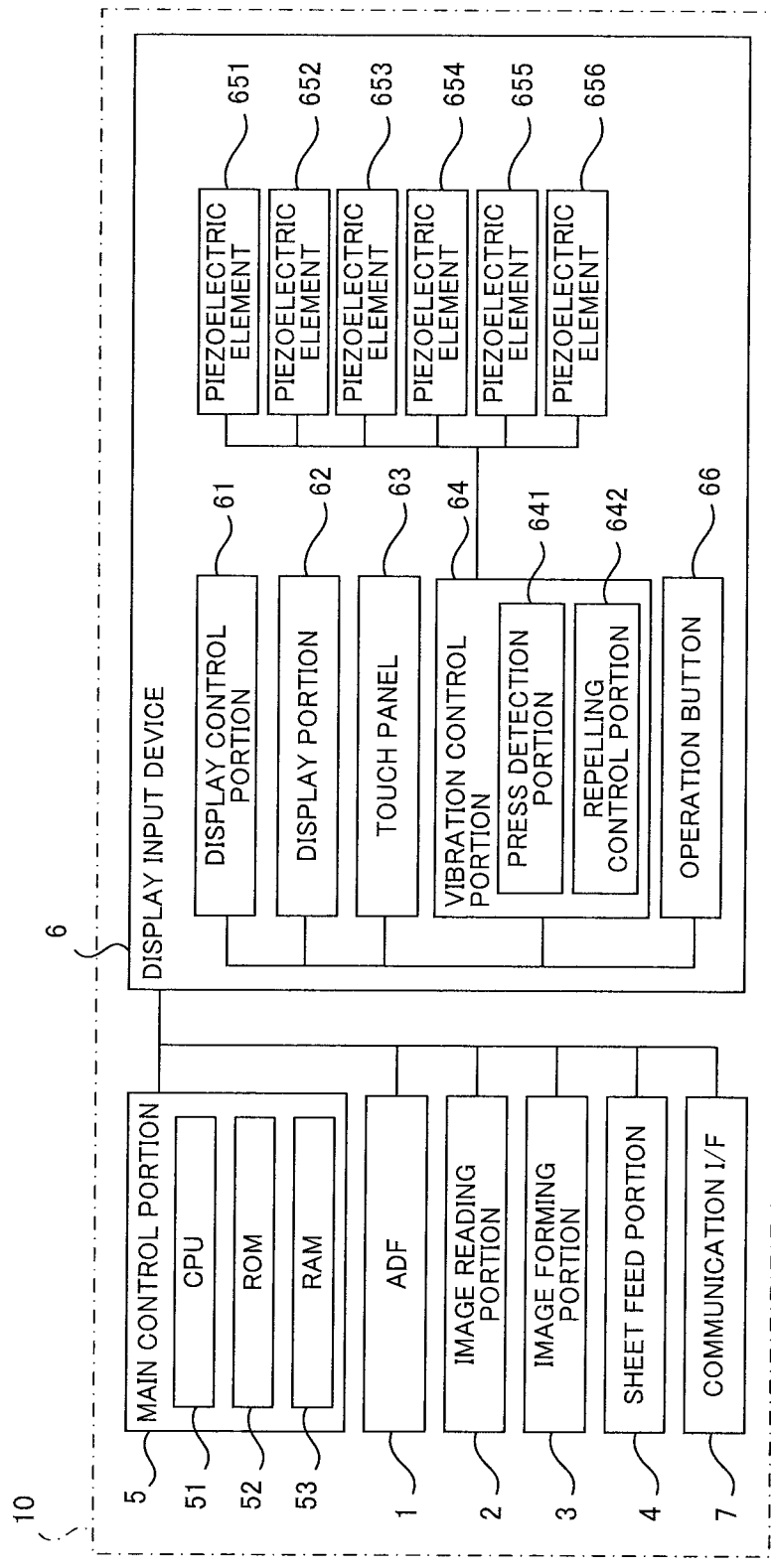
FIG. 2 is a block diagram showing the hardware configuration of the information processing apparatus according to the embodiment of the present disclosure.

As shown in FIG. 1A, FIG. 1B, and FIG. 2, the image forming apparatus 10 includes an ADF 1, an image reading portion 2, an image forming portion 3, a sheet feed portion 4, a main control portion 5, a display input device 6, a communication I/F 7, and the like. The image forming apparatus 10 is a multifunction peripheral having a print function, a facsimile function, a scan function, a copy function, and the like. The image forming apparatus 10 is an example of an information processing apparatus according to the present disclosure. The present disclosure is also applicable to an information processing apparatus such as a printer, a facsimile, a copy machine, a personal computer, a tablet terminal, a smartphone, or a mobile phone.

The ADF 1 is an automatic document feeder including a document set portion 11, a plurality of conveyance rollers 12, a document presser 13, and a sheet discharge portion 14, as shown in FIG. 1A. In the ADF 1, each conveyance roller 12 is driven by a motor (not shown), whereby a document placed on the document set portion 11 passes under a lower surface of the document presser 13 which corresponds to a position for reading image data by the image reading portion 2, and then is conveyed to the sheet discharge portion 14. Thus, the image reading portion 2 can read image data from a document conveyed by the ADF 1.

The image reading portion 2 includes a document table 21, a reading unit 22, a mirror 23, a mirror 24, an optical lens 25, and a CCD (Charge Coupled Device) 26. The document table 21 is a placement portion for a document, provided on an upper surface of the image reading portion 2. The reading unit 22 includes an LED light source 221 and a mirror 222, and is movable in a sub scanning direction (right-left direction in FIG. 1A) by a motor (not shown). The LED light source 221 includes multiple white LEDs arranged along a main scanning direction (depth direction in FIG. 1A). The mirror 222 reflects, toward the mirror 23, light radiated from the LED light source 221 and then reflected by a surface of a document present at the reading position on the document table 21. Then, the light reflected by the mirror 222 is guided into the optical lens 25 by the mirror 23 and the mirror 24. The optical lens 25 converges the entering light into the CCD 26. The CCD 26 has a photoelectric conversion element and the like for inputting, as image data of a document, an electric signal corresponding to the reception amount of light entering from the optical lens 25, to the main control portion 5.

The image forming portion 3 is an image forming portion of electrophotographic type that executes image forming processing (print processing) based on image data read by the image reading portion 2 or image data inputted from an external information processing apparatus such as a personal computer. Specifically, as shown in FIG. 1A, the image forming portion 3 includes a photosensitive drum 31, a charging device 32, an exposure device (LSU) 33, a developing device 34, a transfer roller 35, a cleaning device 36, a fixing roller 37, a pressure roller 38, and a sheet discharge tray 39. In the image forming portion 3, by the following procedure, an image is formed on a sheet fed from a sheet feed cassette 41 which is attachable to and detachable from the sheet feed portion 4, and then the sheet having the image formed thereon is discharged to the sheet discharge tray 39.

First, the photosensitive drum 31 is uniformly charged at a predetermined potential by the charging device 32. Next, light based on image data is radiated to a surface of the photosensitive drum 31 by the exposure device 33. Thus, an electrostatic latent image corresponding to the image data is formed on the surface of the photosensitive drum 31. Then, the electrostatic latent image on the photosensitive drum 31 is developed (visualized) as a toner image by the developing device 34. It is noted that toner (developer) is supplied to the developing device 34 from a toner container 34A which is attachable to and detachable from the image forming portion 3. Subsequently, the toner image formed on the photosensitive drum 31 is transferred onto a sheet by the transfer roller 35. Thereafter, the toner image transferred onto the sheet is heated by the fixing roller 37 to be melted and fixed, while the sheet passes between the fixing roller 37 and the pressure roller 38. It is noted that the remaining toner on the surface of the photosensitive drum 31 is removed by the cleaning device 36.

The main control portion 5 has a CPU 51, a ROM 52, and a RAM 53, as shown in FIG. 2. The CPU 51 is a processor that executes various operation processes. The ROM 52 is a nonvolatile storage portion in which information such as a control program for causing the CPU 51 to execute various processes is stored in advance. The RAM 53 is a volatile storage portion and is used as a temporary storage memory (working area) for various processes executed by the CPU 51. It is noted that the main control portion 5 may be an electric circuit such as ASIC or DSP.

The communication I/F 7 is an interface for executing data communication with an external device connected to the image forming apparatus 10 via a communication network such as the Internet or a LAN.

[Configuration of Display Input Device]

Next, the display input device 6 will be described.

Figure 3:
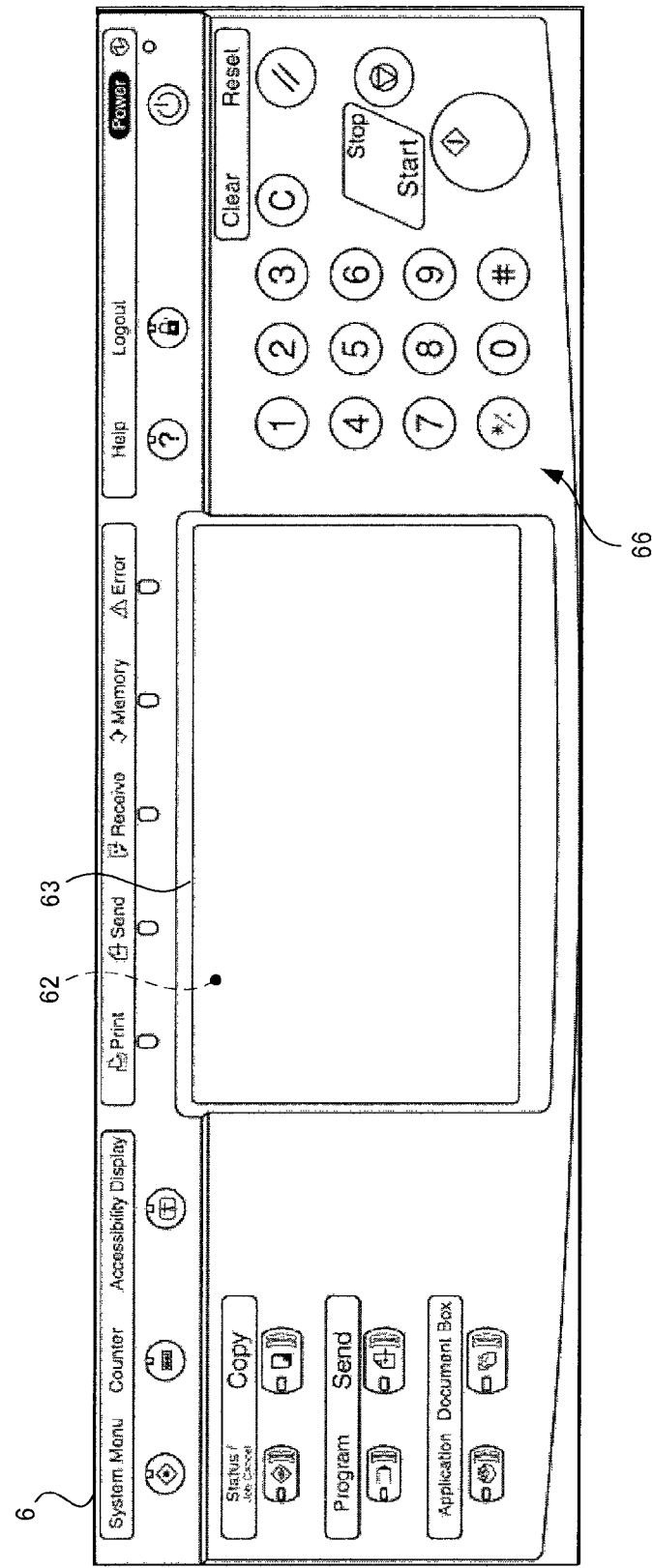
FIG. 3 is a diagram showing a display input device according to the embodiment of the present disclosure.
Figure 4A:
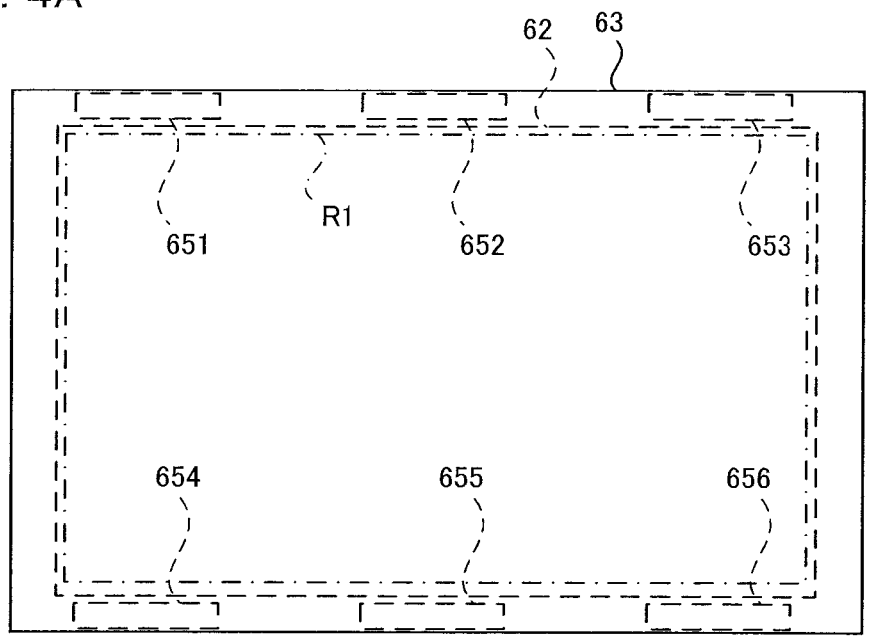
FIG. 4A, FIG. 4B, and FIG. 4C are diagrams showing the configuration of a touch panel of the display input device according to the embodiment of the present disclosure.
Figure 4B:
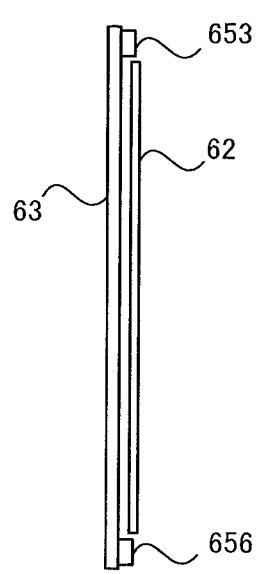
Figure 4C:
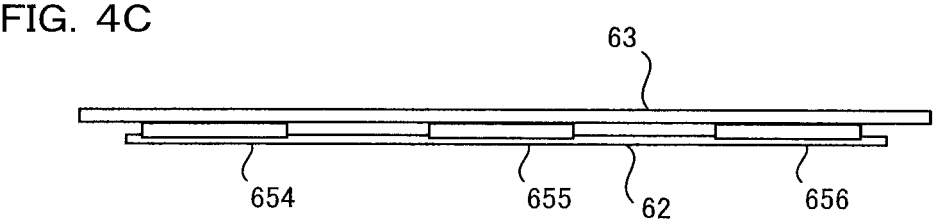

As shown in FIG. 2, FIG. 3, FIG. 4A, FIG. 4B, and FIG. 4C, the display input device 6 includes a display control portion 61, a display portion 62, a touch panel 63, a vibration control portion 64, a plurality of piezoelectric elements 651 to 656, and an operation button 66. As shown in FIG. 3, the operation button 66 includes various hardware keys such as a numerical keypad and a start key, and inputs an operation signal of each hardware key to the display control portion 61. It is noted that FIG. 4A is a plan view of the touch panel 63, FIG. 4B is a left side view of the touch panel 63, and FIG. 4C is a front view of the touch panel 63.

The display control portion 61 has a CPU, a RAM, and a ROM. The CPU is a processor that executes various operation processes. The ROM is a nonvolatile storage portion in which information such as a control program for causing the CPU to execute various processes is stored in advance. In addition, in the ROM, a vibration image visually indicating that the touch panel 63 is operated is stored. It is noted that the vibration image is a concept including a still image and a moving image. The RAM is a volatile storage portion and is used as a temporary storage memory (working area) for various processes executed by the CPU. The display control portion 61 may be an electric circuit such as ASIC or DSP. In another embodiment, the main control portion 5 may also have the function of the display control portion 61.

The display control portion 61 controls display of the display portion 62 in accordance with a control instruction from the main control portion 5. The display portion 62 is, for example, a liquid crystal display panel or an organic EL display. The display portion 62 is controlled by the display control portion 61, to display various kinds of information. For example, on the display portion 62, various kinds of information such as a touch key and a setting screen associated with various operation contents are displayed. The display control portion 61 inputs various operation signals to the main control portion 5 in accordance with a touch operation on the touch panel 63 or an operation on the operation button 66 by a user.

The touch panel 63 is provided on an upper surface of the display portion 62, as shown in FIG. 4B and FIG. 4C. The display portion 62 and the touch panel 63 are supported by a supporting member (not shown). The outer diameter of the touch panel 63 is greater than that of the display portion 62. A region R1 shown in FIG. 4A is a region where the touch panel 63 is exposed on the display input device 6. A region outside the region R1 is covered by a housing of the display input device 6 so that the outside region is invisible to a user who operates the display input device 6.

The touch panel 63 detects a user's touch operation, and inputs position information indicating the position of the touch operation to the display control portion 61. As a result, the display control portion 61 can input, to the main control portion 5, an operation signal set in advance as an operation content associated with the position of the touch operation on a current display screen of the display portion 62. Specifically, the touch panel 63 is a resistive touch panel which detects an operation position based on change in resistance. It is noted that the touch panel 63 may be an electrostatic capacitance touch panel which detects an operation position based on change in electrostatic capacitance.

The piezoelectric elements 651 to 653 are provided on a back surface of the touch panel 63. More specifically, as shown in FIG. 4A, the piezoelectric elements 651 to 653 are arranged at a predetermined interval at an upper end portion (one end in the short-side direction) of the touch panel 63 along the long-side direction of the touch panel 63. In addition, as shown in FIG. 4A, the piezoelectric elements 654 to 656 are arranged at a predetermined interval at a lower end portion (one end in the short-side direction) of the touch panel 63 along the long-side direction of the touch panel 63. It is noted that the piezoelectric elements 651 to 656 are located in the region outside the region R1 so that they are invisible to a user. In addition, the piezoelectric elements 651 to 653 and the piezoelectric elements 654 to 656 are located so as to respectively oppose to each other in the short-side direction of the touch panel 63. It is noted that each of the piezoelectric elements 651 to 656 is composed of a piezoelectric body of a piezoelectric ceramic such as PZT (lead zirconate titanate), and a pair of electrodes sandwiching this.

The vibration control portion 64 has a CPU, a RAM, and a ROM. The CPU is a processor that executes various operation processes. The ROM is a nonvolatile storage portion in which information such as a control program for causing the CPU to execute various processes is stored in advance. The RAM is a volatile storage portion and is used as a temporary storage memory (working area) for various processes executed by the CPU. The vibration control portion 64 may be an electric circuit such as ASIC or DSP. In another embodiment, the main control portion 5 or the display control portion 61 may also have the function of the vibration control portion 64.

The vibration control portion 64 is electrically connected to each of the piezoelectric elements 651 to 656. Voltages generated in the piezoelectric elements 651 to 656 when distortion occurs in the piezoelectric elements 651 to 656 are inputted to the vibration control portion 64. Then, the vibration control portion 64 detects a user's press operation on the touch panel 63 in accordance with output voltages from the piezoelectric elements 651 to 656. More specifically, when a press force greater than that of a touch operation detected by the touch panel 63 acts on the touch panel 63, and a voltage equal to or greater than a predetermined threshold value is inputted as voltages outputted from the piezoelectric elements 651 to 656, the vibration control portion 64 detects that the press operation has been performed. Here, the vibration control portion 64, when detecting a press operation on the touch panel 63, is an example of a press detection portion.

In addition, the vibration control portion 64 can displace each of the piezoelectric elements 651 to 656 to generate vibration, by applying voltage supplied from a power supply (not shown) to each of the piezoelectric elements 651 to 656. In the image forming apparatus 10, when the touch panel 63 is operated, a feeling of operation is transferred to a user by using vibration of the piezoelectric elements 651 to 656. More specifically, when a user's operation is performed on the touch panel 63, the vibration control portion 64 applies a repelling voltage for exerting a force in a direction of repelling the user's operation, to the piezoelectric elements 651 to 656, thereby transferring a feeling of the operation to the user. For example, the repelling voltage is a voltage having a polarity opposite to voltages generated in the piezoelectric elements 651 to 656 when a user performs a press operation on the piezoelectric elements 651 to 656.

When a user slightly touches the touch panel 63, no distortion occurs in the piezoelectric elements 651 to 656. Therefore, even if a repelling voltage for exerting a force in a direction of repelling the user's operation is applied to the piezoelectric elements 651 to 656, a repelling force transferred to the user by the piezoelectric elements 651 to 656 is small, and a feeling of the operation cannot be sufficiently transferred to the user. On the other hand, the image forming apparatus 10 can effectively transfer a feeling of operation on the touch panel 63 to a user, using the piezoelectric elements 651 to 656, as described later.

Figure 5:
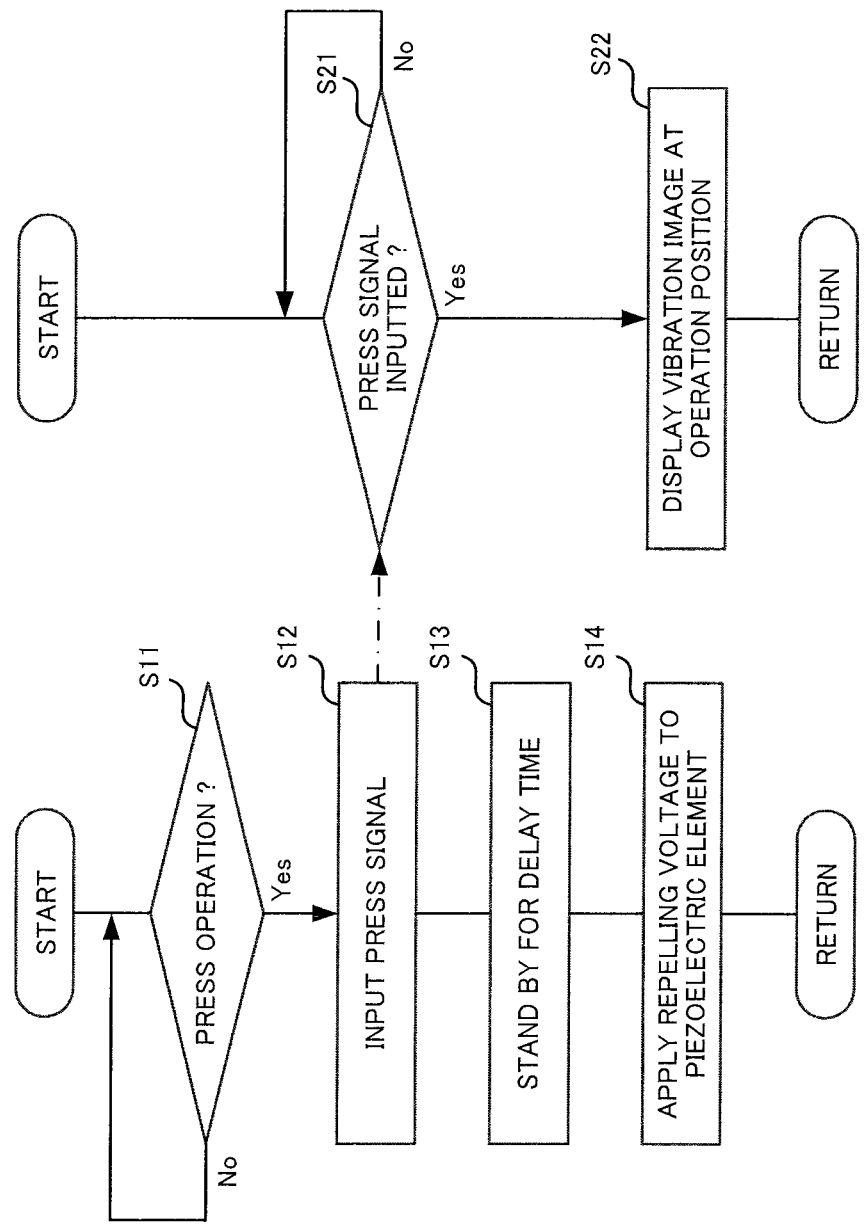
FIG. 5 is flowcharts showing examples of a vibration control process and a display control process executed by the display input device according to the embodiment of the present disclosure.

Hereinafter, with reference to a flowchart in FIG. 5, a vibration control process and a display control process executed by the image forming apparatus 10 will be described. The vibration control process is executed by the vibration control portion 64, and the display control process is executed by the display control portion 61. The display control portion 61 also executes, besides the display control process described here, processing of detecting a touch operation on the touch panel 63, processing of causing the display portion 62 to display various kinds of information, and the like, but the description thereof is omitted here.

[Vibration Control Process]

<Step S11>

First, in step S11, the vibration control portion 64 waits for a press operation on the touch panel 63 (S11: No). Specifically, when a voltage equal to or higher than a predetermined threshold value is inputted by any of the piezoelectric elements 651 to 656, the vibration control portion 64 determines that a press operation has been performed on the touch panel 63. That is, in the display input device 6, a press operation on the touch panel 63 is an operation detected separately from a touch operation on the touch panel 63. Therefore, in a process of a user operating the touch panel 63, at a point when a touch operation is performed on the touch panel 63, the process stands by at the step S11, and thereafter, at a point when the touch panel 63 is further pressed, it is determined that the press operation has been performed. Then, if a press operation has been performed on the touch panel 63 (S11: Yes), the process shifts to step S12.

<Steps S12 and S13>

In step S12, the vibration control portion 64 inputs a press signal indicating that the press operation has been performed on the touch panel 63, to the display control portion 61. Thereafter, the vibration control portion 64 stands by until a delay time elapses which is set in advance as a required time since the display control portion 61 has received the press signal until the vibration image is displayed as described later. The delay time is a time set in advance in order to synchronize vibration of the piezoelectric elements 651 to 656 with display of the vibration image by the display control portion 61. In another embodiment, the standby for the delay time may be omitted.

<Step S14>

Then, after the delay time has elapsed, in step S14, the vibration control portion 64 applies the repelling voltage to the piezoelectric elements 651 to 656, thereby vibrating the piezoelectric elements 651 to 656. More specifically, the vibration control portion 64 applies the repelling voltage for exerting a force in a direction of repelling the user's press operation, to the piezoelectric elements 651 to 656. Here, the vibration control portion 64, when applying the repelling voltage to the piezoelectric elements 651 to 656, is an example of a vibration control portion.

As a result, each of the piezoelectric elements 651 to 656 is displaced in a direction opposite to the user's pressing direction in accordance with the repelling voltage applied by the vibration control portion 64, thereby making an impact on the user. Thus, when a user operates the touch panel 63, the user can obtain a feeling of the operation by an impact transferred from the piezoelectric elements 651 to 656. Particularly, the vibration control portion 64 applies the repelling voltage to the piezoelectric elements 651 to 656, not when a touch is detected on the touch panel 63, but when a user's press operation is detected based on output voltages from the piezoelectric elements 651 to 656. Therefore, the piezoelectric elements 651 to 656 are displaced in an opposite direction when they are sufficiently distorted, so that a feeling of operation can be effectively given to a user. In another embodiment, after applying the repelling voltage, the vibration control portion 64 may apply a vibration waveform such as a sine wave, a rectangular wave, a triangle wave, or a saw-tooth wave to the piezoelectric elements 651 to 656, to continue the vibration.

[Display Control Process]

<Step S21>

Meanwhile, in step S21, the display control portion 61 waits for reception of the press signal from the vibration control portion 64 (S21: No). Then, when the display control portion 61 receives the press signal from the vibration control portion 64 (S21: Yes), the display control portion 61 shifts the process to step S22.

<Step S22>

In step S22, the display control portion 61 causes the display portion 62 to display the vibration image stored in the ROM of the display control portion 61. Thus, the user can visually recognize that the operation has been accepted when the user has operated the touch panel 63, from the display of the vibration image on the display portion 62.

Figure 6A:
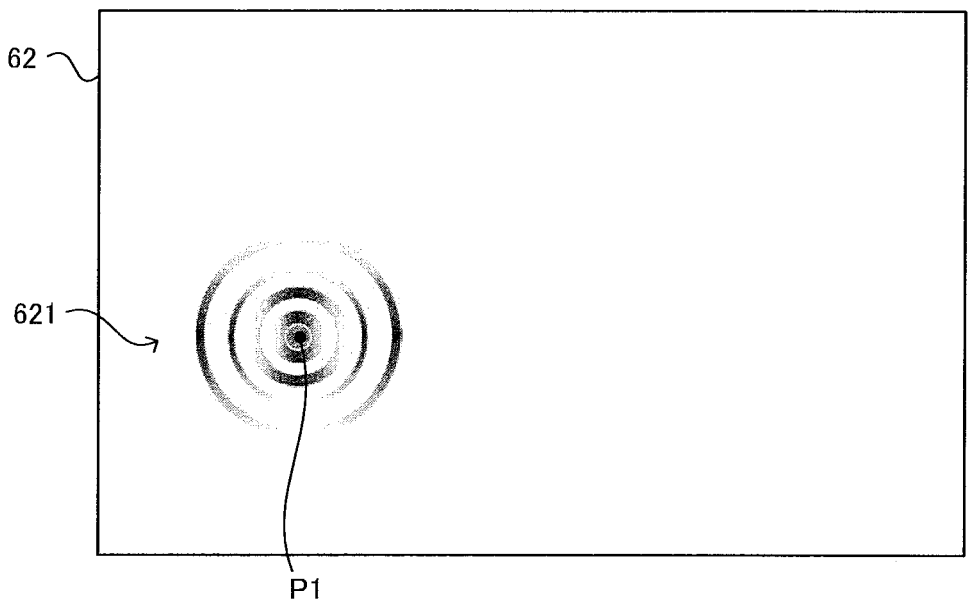
FIG. 6A and FIG. 6B are diagrams showing examples of a vibration image displayed on the display input device according to the embodiment of the present disclosure.
Figure 6B:
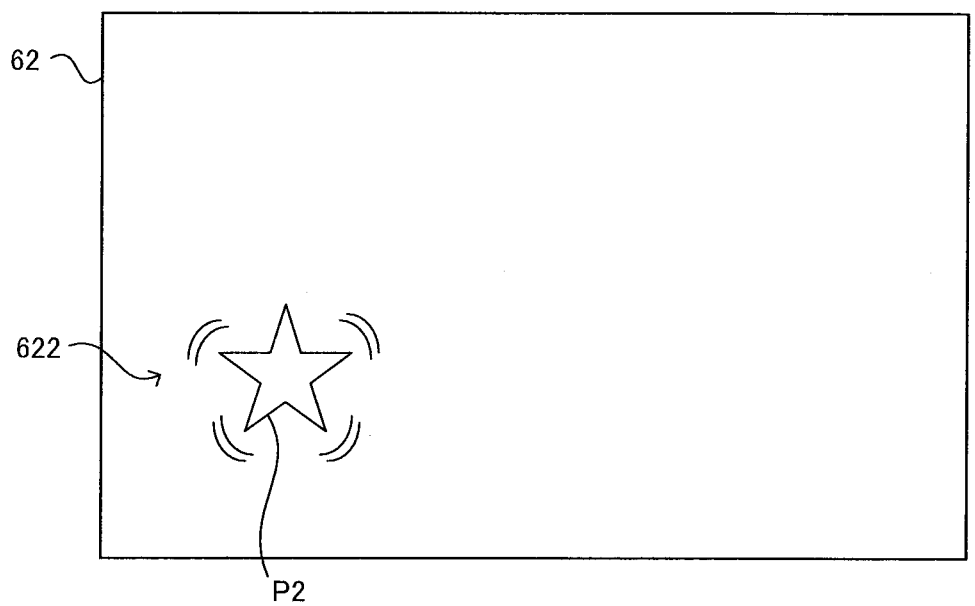

Here, FIG. 6A and FIG. 6B are diagrams showing examples of the vibration image. In the example shown in FIG. 6A, a ripple image 621 broadening around an operation position P1 on the touch panel 63 is displayed as the vibration image on the display portion 62. In the example shown in FIG. 6B, swing of an icon image 622 displayed at an operation position P2 on the touch panel 63 is displayed as the vibration image on the display portion 62. As other examples of the vibration image, an image of a distorted shape of an operated icon, or vibration of the entire display screen on the display portion 62 may be used.

Thus, in the image forming apparatus 10, vibration of the piezoelectric elements 651 to 656 by the vibration control portion 64 and display of the vibration image on the display portion 62 by the display control portion 61 are both executed. Therefore, the image forming apparatus 10 can effectively transfer, to a user, that an operation on the touch panel 63 has been accepted, by vibration of the piezoelectric elements 651 to 656 and display of the vibration image. Particularly, in the image forming apparatus 10, since the standby processing in the step S13 is executed by the vibration control portion 64, it is possible to simultaneously execute vibration of the piezoelectric elements 651 to 656 and display of the vibration image.

In the display input device 6 according to the present embodiment, the piezoelectric elements 651 to 656 are provided on a back surface of the touch panel 63. However, in another embodiment, the piezoelectric elements 651 to 656 may be provided in a divided manner on a front surface and a back surface of the touch panel 63. For example, among the piezoelectric elements 651 to 656, the piezoelectric element 652 and the piezoelectric element 655 which are positioned at the center may be provided on a front surface of the touch panel 63, and the piezoelectric element 651, 653, 654, and 656 may be provided on a back surface of the touch panel 63. As a matter of course, in another embodiment, the piezoelectric elements 651 to 656 may be provided on a front surface of the touch panel 63.

In another embodiment, in the step S14, the vibration control portion 64 may apply the repelling voltage only to a piezoelectric element that is set in advance as a piezoelectric element corresponding to a touch position detected on the touch panel 63, among the piezoelectric elements 651 to 656. Specifically, piezoelectric elements respectively corresponding to predetermined regions on the touch panel 63 are defined, and the vibration control portion 64 applies the repelling voltage only to a piezoelectric element corresponding to the region to which the touch position detected on the touch panel 63 belongs. Thus, only a piezoelectric element that is close to the touch position is vibrated, whereby, for example, a situation in which a plurality of piezoelectric elements 651 to 656 are simultaneously vibrated and their vibrations are cancelled by each other can be avoided. The vibration control portion 64 may detect the position of a press operation on the touch panel 63 in accordance with a predetermined arithmetic expression indicating the relationship between voltage values outputted from the piezoelectric elements 651 to 656 and the position of a press operation.

In display of a vibration image on the display portion 62 in the step S22, the vibration image to be displayed may be changed in accordance with a press signal generated by a press operation being performed on the touch panel 63 in the step S12, that is, in accordance with a press amount (strength of press) on the touch panel 63. For example, in FIG. 6A, as the press amount (strength of press) on the touch panel 63 increases, the ripple image 621 broadening around the operation position P1 may be displayed so as to broaden to a farther distance. In FIG. 6B, as the press amount (strength of press) on the touch panel 63 increases, the icon image 622 displayed at the operation position P2 may be displayed so as to swing more greatly.

In execution of both of vibration of the piezoelectric elements 651 to 656 by the vibration control portion 64 and display of the vibration image on the display portion 62 by the display control portion 61, the vibration of the piezoelectric elements 651 to 656 may be increased in accordance with the press amount (strength of press) on the touch panel 63, that is, as the press amount (strength of press) on the touch panel 63 increases, while the vibration image to be displayed is changed as described above.

In the step S22, a vibration image is displayed on the display portion 62. However, in the case where a user slightly operates the touch panel 63 in the step S12, a repelling force transferred to the user by the piezoelectric elements is small, and a feeling of the operation cannot be sufficiently transferred to the user. Therefore, only when a user slightly operates the touch panel 63, the vibration image may be displayed in order to sufficiently transfer the operation feeling to the user.

In execution of both of vibration of the piezoelectric elements 651 to 656 by the vibration control portion 64 and display of the vibration image on the display portion 62 by the display control portion 61, the vibration of the piezoelectric elements 651 to 656 may be increased in accordance with the press amount (strength of press) on the touch panel 63, that is, as the press amount (strength of press) on the touch panel 63 increases.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display input device comprising:
   a display portion;
   a touch panel provided on an upper surface of the display portion and configured to detect a touch operation;
   a plurality of piezoelectric elements provided in a divided manner on both of a front surface and a back surface of the touch panel;
   circuitry of a display control portion configured to control display of the display portion;
   circuitry of a press detection portion configured to detect, separately from the touch operation, a press operation performed with a greater press force than in the touch operation detected by the touch panel, in accordance with output voltage from the piezoelectric elements; and
   circuitry of a vibration control portion that stands by waiting for a press operation at a point when the touch operation is detected, and is configured to, when a press operation of the piezoelectric elements is detected by the press detection portion, input a press detection signal to the display control portion and apply a voltage having a polarity opposite to the output voltage, as a repelling voltage for exerting a force in a direction of repelling the press operation, to the piezoelectric element, wherein the plurality of piezoelectric elements include three piezoelectric elements arranged at an upper end portion of the touch panel and three piezoelectric elements arranged at a lower end portion of the touch panel, and among each of the three piezoelectric elements arranged at the upper end portion of the touch panel and the three piezoelectric elements arranged at the lower end portion of the touch panel, a piezoelectric element positioned at a center is provided on a front surface of the touch panel and the other two piezoelectric elements are provided on a back surface of the touch panel, when the press detection signal is inputted, the display control portion causes the display portion to display, as a vibration image, a moving image showing vibration of an entire screen of the display portion, and after the vibration control portion has inputted the press detection signal to the display control portion, when a delay time has elapsed which is set in advance as a required time until the signal display is executed by the display control portion, the vibration control portion applies the repelling voltage to the piezoelectric elements.

2. The display input device according to claim 1, wherein circuitry of the vibration control portion applies the repelling voltage only to the piezoelectric element that is set in advance so as to be associated with a position of the touch operation detected by the touch panel.

3. An information processing apparatus comprising the display input device according to claim 1.

* * * * *